Nov. 26, 1968  J. L. HUITT ETAL  3,412,797
METHOD OF CLEANING FRACTURES AND APPARATUS THEREFOR
Filed Oct. 3, 1966
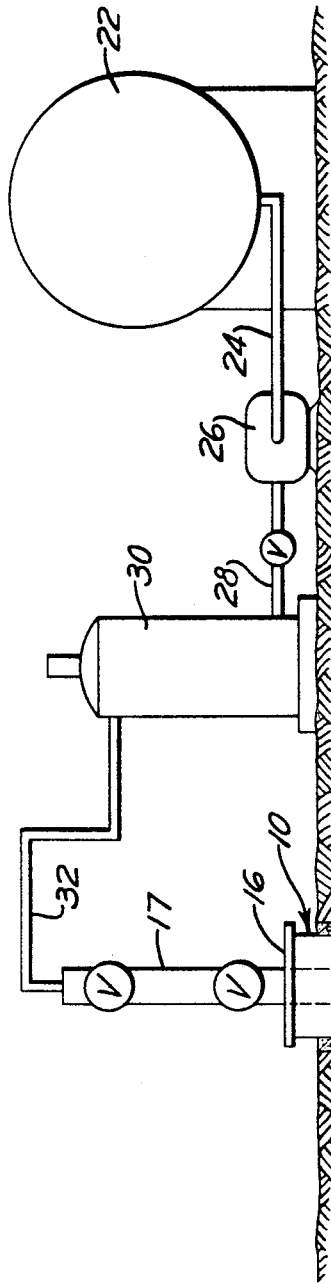
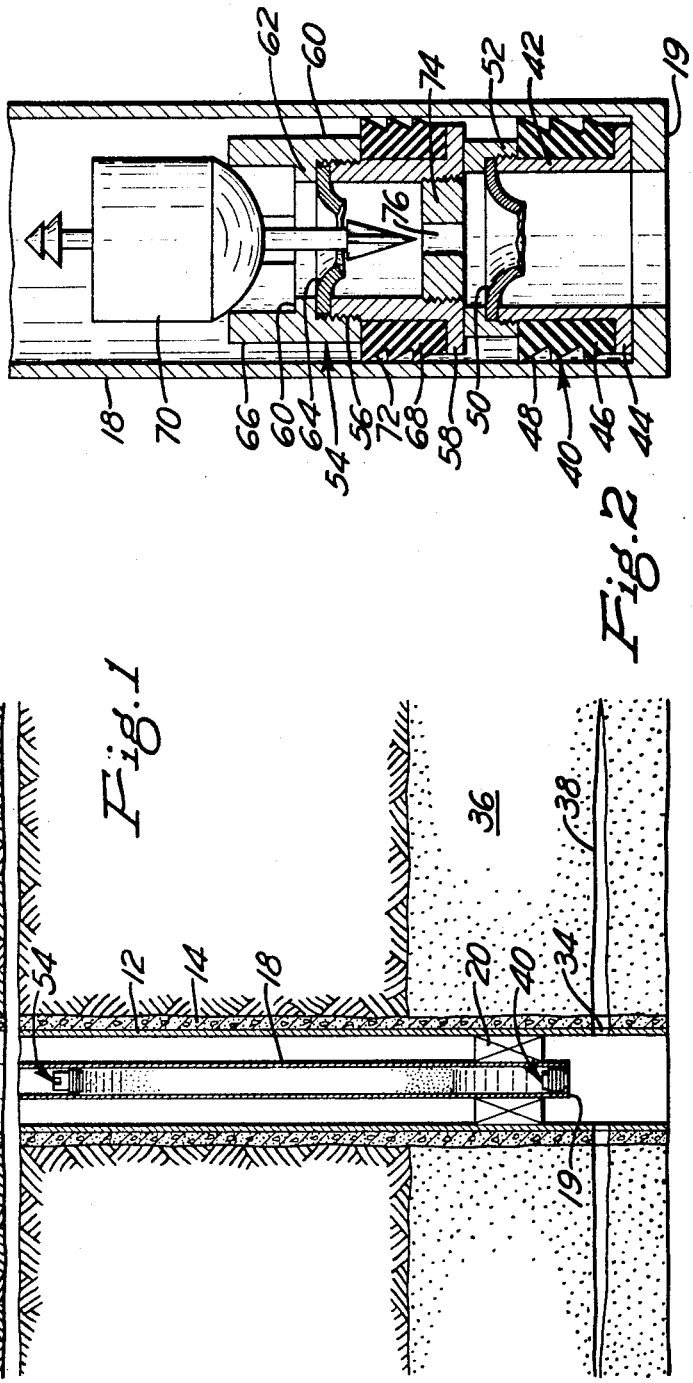
INVENTORS.
JIMMIE L. HUITT
BRUCE B. McGLOTHLIN
ROBERT P. TRUMP

United States Patent Office 3,412,797
Patented Nov. 26, 1968

3,412,797
METHOD OF CLEANING FRACTURES AND APPARATUS THEREFOR
Jimmie L. Huitt, Glenshaw, Bruce B. McGlothlin, O'Hara Township, Allegheny County, and Robert P. Trump, Middlesex Township, Butler County, Pa., assignors to Gulf Research & Development Company, Pittsburgh, Pa., a corporation of Delaware
Filed Oct. 3, 1966, Ser. No. 583,592
10 Claims. (Cl. 166—42)

ABSTRACT OF THE DISCLOSURE

A method for fracturing and propping open fractures in subsurface formations penetrated by a well in which a liquid having a propping agent suspended therein is displaced down the well and into the formation by a compressed gas. After the liquid and propping agent are displaced into the fracture, the gas is held in the fracture for a period allowing dissipation of pressure within the fracture. Thereafter the gas is discharged from the well into the fracture at a rate controlled to avoid displacement of propping agent in the fracture and pressure on the well is reduced to cause the gas to flow from the formation to clean the fracture and formation. The apparatus includes a plug for placement between the gas and the liquid. The plug has a passage therethrough limiting the rate of flow of gas. The passage is closed by means which can be released to allow flow of the gas into the fracture at the desired time.

---

This invention relates to a method of fracturing subsurface formations penetrated by a well and more particularly to a method of cleaning fractures of materials that might interfere with flow through the fracture.

In the hydraulic fracturing operation, a liquid is pumped down a well into contact with the formation that is to be fractured. The liquid is pumped at a rate higher than it can flow through the natural passages in the formation whereby on continued pumping the pressure within the well increases to a level which breaks down the formation and creates a fracture extending from the well into the formation. Thereafter, solid granular particles of propping agent are suspended in a fluid and displaced down the well and into the fracture. The particles are deposited in the fracture and on release of the pressure in the well the particles of propping agent hold the fracture faces apart. In the usual fracturing operation, the propping agent particles are suspended in a highly viscous liquid ordinarily referred to as a carrying liquid. At the end of the fracturing operation, carrying liquid is in the fracture and the formation immediately adjacent the fracture. Unless the carrying liquid is removed or its viscosity reduced, it interferes with flow from the formation through the fracture into the well.

One method of fracturing uses compressed gas in place of pumps to supply the energy for displacing the liquid in which the propping agent is suspended down the well and into the fracture. After the carrying liquid is displaced into the fracture, a plug prevents flow of gas into the fracture. The compressed gas remains within the well and is subsequently discharged to the atmosphere.

This invention resides in a fracturing method in which compressed gas is used to displace propping agent carrying liquid down the well into the fracture, and the gas is held in the well while the pressure within the fracture is dissipated to allow the faces of the fracture to close on the propping agent. Thereafter gas is discharged from the well at a reduced rate into the fracture and the adjacent formation. Upon reduction of pressure in the well, the gas flows from the formation at a high rate to remove from the fracture and the adjacent formation materials that interfere with flow.

In the drawings:

FIGURE 1 is a diagrammatic view, partially in vertical section, of a well utilizing the fracturing process of this invention.

FIGURE 2 shows the lower end of the tubing in the well after displacement of the carrying liquid and propping agent into the fracture.

Referring to FIGURE 1 of the drawings, a well indicated generally by reference numeral 10 is illustrated with casing 12 extending downwardly to the total depth of the well. Casing 12 is cemented in the well by conventional procedures whereby the well is surrounded by a sheath of cement 14. The upper end of the casing 12 is closed by cap 16 through which tubing 18 extends. A lubricator 17 is mounted on the upper end of tubing 18.

Tubing 18, which extends down the well to a depth slightly above the depth of the desired fracture, has an inwardly extending shoulder 19 at its lower end to retain plugs in the tubing in the manner hereinafter described. Tubing 18 is run into the well with a packer 20 which is set in the casing at the desired depth. Because of the high pressure exerted below the lower end of packer 20, a hydraulic hold-down, not shown, of conventional construction may be required to hold the tubing 18 and packer 20 in place.

FIGURE 1 illustrates the preferred embodiment of this invention in which the compressed gas is supplied by vaporizing a liquefied gas such as liquefied nitrogen, carbon dioxide, or methane. Compressed air can be used when the fracturing process is used on a water well but may form an explosive mixture in oil or gas wells. Gas at pressures as high as about 10,000 p.s.i. is required in this fracturing process, and can be obtained from any source such as high-pressure compressors capable of supplying gas at the required pressure. Liquefied nitrogen is available in the oil fields for well treating procedures with pumps capable of delivering nitrogen at pressures as high as 10,000 p.s.i. For convenience, this invention will be described for a fracturing process using liquefied nitrogen with equipment to supply gaseous nitrogen at the required pressure.

Above the surface of the ground is a storage tank 22 for the liquefied nitrogen. Storage tank 22 is a large insulated vacuum-type vessel capable of holding liquefied nitrogen at a temperature of approximately −320° F. An outlet line 24 from the storage tank 22 delivers liquefied gas to a pump 26 which increases the pressure on the liquefied gas to the level required for the fracturing operation. The liquefied gas at high pressure passes through line 28 to a vaporizer 30. Gas from vaporizer 30 is delivered through a line 32 to the upper end of the lubricator 17. The storage tank 22, pump 26, and vaporizer 30 are available in the oil fields mounted on a single truck to provide nitrogen for use in wells.

The casing 12 is perforated or notched at 34 to provide access into a fluid-bearing subsurface formation 36 penetrated by the well 10. Any of the conventional techniques for cutting through casing, such as shaped charges, mechanical cutters, or abrasive slurries can be used to cut the opening 34. After the opening 34 has been cut in the casing, a fracturing liquid is pumped down the well. The fracturing liquid can be any liquid conventionally used in fracturing operations that permits an increase in pressure adequate to break down the formation to initiate the fracture. The particular fracturing liquid used will depend in part on the permeability of the formation to be fractured. Water can be used to initiate the fracture in formations of low permeability. A preferred fracturing liquid is a low-penetrating liquid such as a highly viscous liquid or gel which because of its viscosity offers high resistance to flow through permeable formations. Gelled oils such as diesel oil or crude oil containing soap are effective fracturing liquids. Another suitable fracturing liquid is a liquid to which finely divided solid material, for example, silica flour, has been addded. The finely divided solid material filters from the liquid to seal temorarily the exposed formation and reduces the flow of liquid into the formation. Water to which a gelling material such as guar gum has been added is a preferred low-penetrating liquid having both properties of high viscosity and sealing the face of a permeable formation.

After pumping the fracturing liquid into the tubing, the pressure on the liquid is increased until formation 36 breaks down to initiate a fracture 38. A small capacity, high-pressure pump can be used to initiate the fracture. Because equipment for injecting compressed gas into the well is available at the well site for use later in the fracturing process, it is preferred to use the liquefied nitrogen pump 26 and vaporizer 30 to supply the pressure to initiate the fracture. When the breakdown occurs, as indicated by the formation taking the fracturing liquid, pumping of the nitrogen into the well is stopped and the pressure on the well is relieved. It is preferred to inject a small amount, such as one barrel, of a gelled liquid into the well after release of the pressure to fill the well between the lower end of the tubing and the fracture 38.

The small volume of gelled liquid is followed by a blowout plug 40. Referring to FIGURE 2 in which blowout plug 40 is shown in cross section, the blowout plug consists of a hollow mandrel 42 having an outwardly extending flange 44 at its lower end. A sealing element 46 consisting of a sleeve of deformable material, such as neoprene, having a plurality of upwardly concave rings 48 extending from its outer surface is mounted on the outer surface of the mandrel. A blowout disc 50 is held in place on the upper end of the mandrel 42 by a cap 52 which is screwed onto the upper end of the mandrel and bears against the upper end of the sealing element 46 to hold it in place. Cap 52 has a central opening which allows pressure on the fluids above the blowout plug to be exerted against the blowout disc 50. The blowout plug makes a liquid-tight seal against the casing to prevent downward flow of fluid in the well until the pressure above the plug is high enough to rupture the blowout disc.

The blowout plug 40 is followed into the tubing by a spearhead of propping-agent-free, low-penetrating liquid which may be the same as the liquid used in the initiation of the fracture. The purpose of the spearhead is to open the fracture wide to allow entrance of propping agent and extend the fracture from the well for the desired distance into the surrounding formation. In the preferred form of the invention, the spearhead is a low-fluid loss liqiud adapted to seal the faces of the fracture. The spearhead should be high in gel strength or viscosity to prevent settling of the propping agent. A minimum gel strength of ½ pound per square foot as determined on the Fann viscometer will be suitable for most propping agents to cause a propping-agent fall rate less than one foot per minute. A fall rate higher than one foot per minute results in excessive settling of the propping agent if there should be any delay in the fracturing operation. It is preferred that the rate of fall of the propping agent be less than 10 feet per hour. The gel strength and viscosity of the spearhead required to give the desired rate of fall will depend on the size and density of the propping agent and the density of the spearhead. The volume of the spearhead is the volume calculated to leak off through the faces of the fracture as the spearhead is displaced into the fracture to extend the fracture and create the desired fracture area. A spearhead volume of 2–5 barrels is used in a typical fracturing operation using this invention.

The spearhead is followed by a carrying liquid having a propping agent suspended in it. The carrying liquid should have a gel strength and viscosity such that the propping agent falls through the carrying liquid at a rate less than one foot per minute, and preferably less than 10 feet per hour. The amount of carrying liquid will depend on the desired size of the fracture. A volume of 2 to 10 barrels is ordinarily used. Larger volumes can be used when the volume of the well is large.

An important object of this invention is to provide a fracture of very high flow capacity immediately adjacent the well. A spearhead and carrying liquid of higher viscosity than is used in conventional fracturing is used in this invention to open the fracture wide enough to receive large propping agents, and thereby provide a fracture of the desired high-flow capacity. Water thickened with a suitable gelling agent such as WG–4, a guar gum fracturing liquid additive sold by Halliburton Company, in a concentration of 2 percent is a suitable carrying liquid having a viscosity of approximately 72 centipoises and a gel strength of approximately 1.3 lbs./square foot. 6–8 mesh glass pellets will fall through that liquid at a rate of approximately 1.6 ft./hr. Carrying liquids used in conventional fracturing processes ordinarily contain less than one-half as much thickening agent as is preferably used in this invention. Crude or refined oils containing a soap to give the oil a viscosity resulting in the desired propping-agent fall rate less than one foot per minute and preferably less than 10 feet per hour also can be used.

The propping agent suspended in the carrying liquid can be any of the several types of propping agents used in conventional hydraulic fracturing methods. Typical such propping agents are sand, nutshell particles, glass beads, and aluminum pellets in sizes ranging from 8 to 40 mesh in the U.S. Sieve Series. An important advantage of this process is that the propping agent does not pass through high-pressure pumps; hence, larger propping agents can be used. The maximum propping agent size is limited by the width the fracture can be opened to allow entry of the propping agent at the injection conditions used. Preferred propping agents are hard glass beads of the type described in U.S. Patent No. 3,175,616 having a size in the range of 4 to 8 mesh in the U.S. Sieve Series. Larger particles, up to about 0.5 inch in diameter, can be used. The propping agent can be suspended in the carrying liquid at any desired concentration such as 0.1 to 5.0 lbs./gal.

The carrying liquid is followed by a small volume, preferably approximately the volume in the casing between the lower end of the tubing and the fracture 38, of propping-agent-free liquid, and that small volume of liquid is followed by a wiper plug 54. A suitable wiper plug, illustrated in FIGURE 2, has a central sleeve 56 with an outwardly extending flange 58 at its lower end. Sleeve 56 is externally threaded at its upper end to receive a collar 60. Collar 60 has an inwardly extending shoulder 62 which engages the upper surface of a blowout disc 64 and holds the blowout disc in place on the upper end of sleeve 56. Blowout disc 64 has a higher strength than blowout disc 50; hence, it does not rupture when the well is pressured to rupture disc 50. A series of fingers 66 extends upwardly above the shoulder 62 to support a weighted dart 70 in the manner hereinafter described. Mounted on the sleeve 56 and compressed between the lower end of the collar 60 and the upper surface of flange 58 is a sealing member 68 constructed of a suitable deformable material such as neoprene. The sealing member 68 has outwardly extending ribs 72 adapted to engage the inner surface of the tubing 18. The lower end of sleeve 56 has interior threads which engage threads on an orifice plate 74. Orifice plate 74 has a restricted passage 76 extending through it to control the rate of flow through it.

After the wiper plug 54 has been inserted in the upper end of tubing 18, the pipe 32 is connected to the upper end of the tubing 18 and nitrogen is pumped into the tubing above the wiper plug. The pressure on the nitrogen and the pressure transmitted to the liquid above the blowout disc 50 are increased until the blowout disc 50 is ruptured, as is shown in FIGURE 2. The nitrogen expands rapidly to displace the spearhead and carrying liquid into the fracture at a high rate whereby the fracture 38 is opened wide to permit entrance of large-size particles of propping agent. If the spearhead contains a material adapted to seal the faces of the fracture to reduce leak off of fracturing liquid, displacement of the propping agent to the outer reaches of the fracture is facilitated.

During the expansion of the nitrogen after the blowout disc is ruptured, pump 26 continues to run and displace nitrogen into the upper end of the tubing 18. The plug 54 is forced downwardly through the tubing 18 by the expanding compressed gas until the wiper plug engages the upper end of the blowout plug 40. Further expansion of the nitrogen and the flow of the nitrogen from the lower end of the tubing is prevented by the wiper plug 54. The pump 26 is stopped and the well is shut in for a period, such as 4 to 24 hours, during which the formation 36 closes on the propping agent in the fracture 38.

After the pressure in the fracture has had an opportunity to drop to a level at which the faces of the fracture are supported by the propping agent, the weighted dart 70 is dropped down the well from lubricator 17. A rod may be used in place of dart 70 to rupture the disc. Another way of rupturing disc 64 is to construct it of a metal such as magnesium or aluminum and drop an acid or a strong alkali to dissolve the disc. Passage 76 in the orifice plate 74 has a size that will restrict the rate of flow of compressed gas through the blowout disc 64 to a rate which will not displace the propping agent in the fracture or exceed the overburden pressure to lift the faces of the fracture from the propping agent. The compressed gas moves outwardly through the fracture and into the surrounding formation. After equilibrium is obtained, the upper end of the well is opened and the gas that has entered the formation flows rapidly through the fracture back into the well to clean viscous liquids and finely divided particles of liquid-loss additives from the fracture. Backflow of gases will frequently allow the well to be put on production without a swabbing operation that would be required in the absence of the backflow of the gas.

It is important to the production of a fracture having a high-flow capacity that the propping agent remain in place in the fracture. To avoid displacement of the fracture, the diameter of passage 76 in orifice plate 74 should be such that the pressure drop through the passage will preclude a gas pressure in the fracture high enough to lift the overburden. In a typical fracturing operation using gas to displace a carrying liquid into a fracture, the gas pressure when plug 54 reaches plug 40 will be approximately 1½ times the overburden pressure. If, after rupturing disc 64, the gas flows through the passage at the critical velocity, the pressure on the downstream side of passage 76 will be approximately one-half the pressure in tubing 18. Thus, passage 76 should have a diameter such that the flow through the passage is at a slower rate than gas will leak through the fracture faces when the gas pressure in the fracture is at the overburden pressure. A diameter of ¼ inch or less will in practically all instances be satisfactory. Passages having a diameter as small as 1/32 inch can be used but will delay reaching an equilibrium between the gas in the tubing and the gas in the fracture.

We claim:

1. A method of fracturing a subsurface formation penetrated by a well comprising initiating a fracture extending from the well into the subsurface formation, injecting a liquid having a propping agent suspended therein into the well, injecting a gas into the well above the liquid, increasing the pressure on the gas to displace the liquid from the well into the fracture while preventing flow of gas from the well into the fracture, holding the gas in the well until the pressure within the fracture decreases to allow the faces of the fracture to close on the propping agent, and thereafter discharging the gas from the well into the fracture at a rate less than that required to lift the faces of the fracture from the propping agent.

2. In a method of fracturing a subsurface formation penetrated by a well in which a gas under a high pressure displaces a fracturing liquid having propping agent suspended therein from the well into the fracture, the improvement comprising holding the gas in the well after displacement of the fracturing liquid until the pressure in the fracture is less than the overburden pressure, and thereafter discharging said gas from the well into the fracture at a rate controlled to avoid displacement of the propping agent in the fracture.

3. A method of fracturing a subsurface formation in a well having tubing extending down the well to the zone of the fracture comprising initiating a fracture extending from the well into the formation, supporting in the lower end of the tubing a first plug having a rupture disc therein controlling flow through the plug, injecting a fracturing liquid having propping agent suspended therein into the tubing above the first plug, inserting a second plug having a rupture disc adapted to control flow therethrough in the tubing above the fracturing liquid, the rupture disc in said second plug being constructed to rupture at a higher pressure than the first plug, injecting gas into the tubing above the second plug to increase the pressure in the tubing and rupture the first plug and thereby displace the fracturing liquid into the fracture and to move the second plug down the tubing to rest on the first plug, allowing pressure within the fracture to decrease whereby the faces of the fracture close on the propping agent deposited therein by the fracturing liquid, rupturing the rupture disc in the second plug to permit flow of gas from the tubing into the fracture, and passing gas flowing through the second plug through a restricted passage therein to restrict the rate of flow of gas into the fracture and avoid displacement of propping agent in the fracture.

4. A method as set forth in claim 3 in which the restricted opening has a diameter in the range of 1/32 to ¼ inch.

5. A method as set forth in claim 3 in which the rupture disc in the second plug is ruptured by dropping a bar down the well to strike the rupture disc.

6. Apparatus for fracturing a subsurface formation penetrated by a well by injecting compressed gas into the well behind a fracturing liquid to displace the fracturing liquid from the well comprising tubing extending downwardly through the well to the zone of the fracture, an inwardly extending shoulder at the lower end of the tubing, a first plug in the tubing adapted to rest on the shoulder, said first plug having a passage therethrough closed by a rupture disc, a second plug adapted to be supported in the tubing by the first plug and having a passage therethrough, a rupture disc in the second plug closing a passage through the second plug and adapted to rupture at a higher pressure than the rupture disc in the first plug, and an orifice plate extending across the second plug having a restricted opening therein adapted to control the rate of flow through the second plug.

7. In apparatus for fracturing a subsurface formation penertated by a wall utilizing compressed gas to force a fracturing liquid having a propping agent suspended therein down tubing and into the fracture, the improvement comprising a plug for insertion in the tubing between the compressed gas and the fracturing liquid, said plug having an opening extending therethrough, a rupture disc closing the opening, an orifice plate extending across the opening in the plug, and a passage through the orifice plate having a diameter adapted to restrict the rate of flow of gas through the plug to a rate below the rate causing displacement of the propping agent in the fracture.

8. In combination, a well penetrating a subsurface formation, tubing in said well extending substantially to said subsurface formation and in communication therewith, a first body of fluid in said tubing, first separating means at the upper end of said first body of fluid, a second body of fluid above said first separating means, second separating means at the upper end of said second body of fluid, a third body of fluid above said second separating means, said third body of fluid comprising a gas under a pressure sufficient to drive said first and second bodies of fluid and said first and second separating means down said tubing with sufficient force to cause said first body of fluid to create a fracture in said formation, means to stop the downward motion of said first separating means in said tubing after said first body of fluid is expelled into the formation to create a fracture, means to selectively open said first separating means to permit flow of said second body of fluid through said first separating means and into said fracture, means to stop the downward motion of said second separating means in said tubing after all of said second body of fluid is expelled into said fracture, and means to selectively open said second separating means to permit flow of said gas through said second separating means into said fracture.

9. The combination of claim 8, said second separating means including means to control the flow of said gas therethrough.

10. In apparatus for fracturing a subsurface formation penetrated by a well by the process in which gas drives a suspension of proppant in a liquid down the well into a fracture created in the formation, the improvement comprising a plug adapted to retain the driving gas within the well after the proppant is in the fracture, a passage extending through the plug, said passage having a size adapted to restrict the flow of gas through the plug to a rate avoiding displacement of propping agent in the fracture, means closing the passage to prevent flow through the plug, and means to release the closing means to allow flow through the passage.

References Cited

UNITED STATES PATENTS

| 2,635,697 | 4/1953 | Cannon | 166—155 |
| 3,087,551 | 4/1963 | Kerver | 166—155 X |
| 3,090,436 | 5/1963 | Briggs. | |
| 3,097,691 | 7/1963 | Smith | 166—153 X |
| 3,170,517 | 2/1965 | Graham et al. | |
| 3,200,882 | 8/1965 | Allen | 166—155 X |
| 3,213,940 | 10/1965 | Wood | 166—28 X |

JAMES A. LEPPINK, *Primary Examiner.*

I. A. CALVERT, *Assistant Examiner.*